(12) United States Patent
White, III et al.

(10) Patent No.: US 7,051,143 B2
(45) Date of Patent: May 23, 2006

(54) METHOD, SYSTEM AND PROGRAM FOR THE TRANSMISSION OF MODBUS MESSAGES BETWEEN NETWORKS

(75) Inventors: William A. White, III, Carlisle, MA (US); Steven Webster, Raymond, NH (US); Randy Dircks, Chester, NH (US); Ken Wester, Nashua, NH (US)

(73) Assignee: Schneider Automation Inc., North Andover, MA (US)

( * ) Notice: Subject to any disclaimer, the term of this patent is extended or adjusted under 35 U.S.C. 154(b) by 597 days.

(21) Appl. No.: 09/888,158

(22) Filed: Jun. 25, 2001

(65) Prior Publication Data

US 2004/0054829 A1     Mar. 18, 2004

(51) Int. Cl.
*G06F 13/14*     (2006.01)

(52) U.S. Cl. ............... 710/305; 710/315; 710/306; 709/153

(58) Field of Classification Search ............. 710/105, 710/305–306; 709/249, 153; 370/241, 351
See application file for complete search history.

(56) References Cited

U.S. PATENT DOCUMENTS

| | | | |
|---|---|---|---|
| 5,557,545 A | 9/1996 | Löffel et al. | |
| 5,598,149 A | 1/1997 | Schreiter et al. | |
| 5,754,548 A | 5/1998 | Hoekstra et al. | |
| 5,805,442 A | 9/1998 | Crater et al. | |
| 5,978,578 A | 11/1999 | Azarya et al. | |
| 6,070,213 A * | 5/2000 | Giordano | 710/305 |
| 6,122,686 A | 9/2000 | Barthel et al. | |
| 6,151,625 A | 11/2000 | Swales et al. | |
| 6,192,281 B1 * | 2/2001 | Brown et al. | 700/2 |
| 6,266,726 B1 * | 7/2001 | Nixon et al. | 710/105 |
| 6,301,527 B1 * | 10/2001 | Butland et al. | 700/286 |
| 6,360,277 B1 * | 3/2002 | Ruckley et al. | 709/250 |
| 6,434,157 B1 * | 8/2002 | Dube' et al. | 370/401 |
| 6,466,995 B1 * | 10/2002 | Swales et al. | 710/11 |
| 6,859,843 B1 * | 2/2005 | Sanchez | 709/250 |
| 2002/0093951 A1 * | 7/2002 | Rupp et al. | 370/362 |
| 2002/0107984 A1 * | 8/2002 | Rawson | 709/246 |
| 2002/0112070 A1 * | 8/2002 | Ellerbrock et al. | 709/238 |
| 2002/0128986 A1 * | 9/2002 | Stutz | 705/401 |
| 2002/0194365 A1 * | 12/2002 | Jammes | 709/237 |
| 2003/0065855 A1 * | 4/2003 | Webster | 710/260 |

* cited by examiner

*Primary Examiner*—Rehana Perveen
*Assistant Examiner*—Kim T. Huynh

(57) ABSTRACT

The present invention is directed to facilitating communication within an automation system having a plurality of networks and network protocols. Specifically, a Modbus network is operably connected to a network. A fieldbus coupler operably connected to both networks having a program facilitates communication within the automation system wherein devices connected to the network can be accessed for monitoring and/or controlling via Modbus commands. The fieldbus coupler (FBC) program accepts a Modbus function code containing one or more embedded message of varying types. The FBC program using additional information contained in the Modbus function code and the message type reads or writes only the required information to and from the field devices. This specific read or write request of the information and the embedding of more than one message type reduces overhead and bandwidth usage, thus improving bus response time and efficiency.

32 Claims, 6 Drawing Sheets

42

| | |
|---|---|
| Data | 46 |
| Function Code | 40 |
| Device ID | 44 |

| | |
|---|---|
| Error Check | 74 |
| Read/Write Data | 70 |
| Number Low Bytes | 68 |
| Number High Bytes | 66 |
| Starting Low Address | 64 |
| Starting High Address | 62 |
| Sub-Index | 60 |
| Index Low | 58 |
| Index High | 56 |
| Node ID | 54 |
| Extend Bit | 52 |
| Reference Type | 50 |
| Function Code "43" | |
| Slave ID | 72 |

| | |
|---|---|
| Error Check | 174 |
| \* \* \* Next Function Code \* \* \* | |
| \* \* \* Next Function Code \* \* \* | |
| Read/Write Data | 170 |
| Number Low Bytes | 168 |
| Number High Bytes | 166 |
| Starting Low Address | 164 |
| Starting High Address | 162 |
| Sub-Index | 160 |
| Index Low | 158 |
| Index High | 156 |
| Node ID | 154 |
| Extend Bit | 152 |
| Reference Type | 150 |
| Function Code | |
| Reserved Byte | |
| Function Code "41" | |
| Slave ID | 172 |

*Fig. 2C*

| Modbus function code | Sub-function or sub-index | Command |
|---|---|---|
| 3 | | Read 4x registers |
| 4 | | Read 3x registers |
| 16 | | Write 4x registers |
| 22 | | Mask write |
| 23 | | Combination 4x read/write |
| 43 | | Read Object Dictionary entries |
| 43 | | Write Object Dictionary entries |
| 43 | 1 | COMS-Reset_req |
| 43 | 2 | Start_BootUpAuto_req |
| 43 | 3 | Command not used |
| 43 | 4 | Run_Network_req |
| 43 | 5 | Stop_Network_req |
| 43 | 6 | Store_Config_req |
| 43 | 7 | Store_Config_Sim_req |
| 43 | 8 | Restore_Config _req |
| 43 | 9 | Request mastery over PI output data for AI-config-tool |
| 43 | 10 | Release mastery over PI output data for AI-config-tool |
| 43 | 11 | Request mastery over application parameter area for AI-config-tool |
| 43 | 12 | Release mastery over application parameter area for AI-config-tool |
| 43 | 13 | Save password for access via config port |
| 43 | 14 | Set FBC into protected mode |
| 43 | 15 | Set FBC into edit mode (= leave protected mode) |
| 125 | | Flash programming commands |
| 125 | 1 | Read hardware identification |
| 125 | 2 | Not supported |
| 125 | 3 | Not supported |
| 125 | 4 | Confirm mode |
| 125 | 5 | Enter kernel mode |
| 125 | 6 | Exit kernel mode |
| 125 | 7 | Fill flash memory |
| 125 | 8 | Program flash memory |
| 125 | 9 | Read flash memory |
| 126 | | Programming commands |
| 126 | 1 | Stop |
| 126 | 2 | Start |

*Fig. 4*

METHOD, SYSTEM AND PROGRAM FOR THE TRANSMISSION OF MODBUS MESSAGES BETWEEN NETWORKS

TECHNICAL FIELD

This invention relates generally to the field of automation networks. More specifically, the present invention relates to a method, system and computer program product for communicating Modbus messages between networks to control or monitor a network device.

BACKGROUND OF THE INVENTION

Modbus, Profibus, DeviceNet, CANOpen and Ethernet-based networks are utilized in factory automation and related fields for communicating between data processing systems and peripheral devices. Local area networks (LAN) interconnect factory equipment and other devices such as programmable logic controllers (PLC), fieldbus couplers (FBC), industrial power monitors, e.g., any of the Quantum PLCs by Schneider Automation Inc., and computer work stations for monitoring and programming PLCs and other devices related to factory automation. The Modbus protocol is widely used for factory automation applications. The Modbus protocol is described in the "Modbus Protocol Reference Guide," publication PI-MBUS-00 by Schneider Automation Inc. and is incorporated herein by reference. Modbus Plus is a LAN protocol for industrial control applications. Applications of the Modbus Plus protocol are described in the "MODBUS Plus Network and Installation Guide," 890 USE 100 00 Version 3.0, Schneider Electric, April. 1996, and is incorporated by reference.

The Modbus protocol is well known and is described, for example, on the World Wide Web, (Web) at modicon.com/techpubs/toc7.html, and is incorporated herein by reference along with all related Web pages. Different networking schemes relating to factory automation are described in U.S. Pat. Nos. 6,151,625; 5,805,442; 5,251,302; and 5,699,350, and are also incorporated herein by reference.

A Modbus frame comprises three basic parts. The first part is an address field for storing a device identifier (ID). The ID identifies the slave device to which the Modbus frame is to be sent when the message is being sent from a master device. When the frame originates at a slave device and is to be sent to a master device, the ID identifies the slave device from which the Modbus frame was sent. Thus, a master addresses a slave by placing the slave address in the address field of the message, and when the slave sends its response, the slave places its own address in the address field to inform the master which slave is responding. Further contained in the Modbus frame is a function code. The function code informs the receiving device what type of function or operation will be performed by the Modbus frame. For example, a function code, "126," causes a subsystem of devices to start or stop depending upon function code "126's" sub-function code, i.e., 1 or 2. Yet another function code, function code "125," reads the hardware identification to the master device. The last part of the Modbus frame includes a data field containing data pertinent to the function code in question, i.e., a CANOpen message for function code "43" in the present invention The type of CANOpen message determines the means of communication between the nodes on the CANOpen network. CANOpen is a standard and is described, for example, on the Web at can-cia.de.html, and is incorporated herein by reference along with the related web pages. A typical CANOpen network allows communication among and between many operably connected devices from different manufacturers.

To communicate process data from the node-device, a Process Data Object (PDO) message is used. To communicate configuration data from and between node-devices, a Service Data Object (SDO) is used to update the node's Object Dictionary (OD). The OD contains a list of devices and what each device controls, e.g., temperature, pressure, etc. Each node is connected to one or more input/output devices that measure and control a process. Different control systems are described in U.S. Pat. Nos. 6,151,640; 6,122,686; 6,111,886; 5,978,578; 5,598,149; 5,754,548; and 5,557,545. Thus, a Modbus device on a CANOpen network must be able to read and write CANOpen messages to communicate with other CANOpen devices on the network.

Although Modbus has become an industry standard, other technologies have been developed for different automation activities. Modbus is a serial communication protocol that has a limited number of nodes in a master/slave relationship. The master node is the network node issuing the Modbus frame, while the slave node is the receiver of the Modbus frame. In addition, Modbus is limited to 256 bytes in length.

As the industry moves toward interoperability, that is, a seamless data transfer between data transfer protocols such as CANOpen, the number of third party devices requiring addressing increases, further increasing maintenance and complexity of network addressing schemes. CANOpen is a third party protocol that has brought enhanced performance and openness, but not without its limitations.

This invention is directed to solving these and other problems.

SUMMARY OF THE INVENTION

The present invention is directed to an automation system comprising a Modbus device having an embedded automation application. The Modbus device is connected to a communication bus. This bus protocol can transmit or receive Modbus device commands. A fieldbus coupler is operably connected to the automation application via the communication bus. A second network having its unique protocol is connected to the same fieldbus coupler. The fieldbus coupler (FBC) has among other components, a table for holding data and parameters transmitted or received throughout the automation system. A protocol utilized by the automation application and stored at the FBC or on the programmable logic controller (PLC) provides access to the second network and its attached field devices. Field devices include such devices as analog inputs or outputs, digital or binary inputs, digital or binary outputs or other special devices, etc. The field devices and devices that control these field devices, e.g., PLCs or FBCs, are networked together. Various types of network protocols such as: Interbus S, Profibus DP, Modbus, Echelon, Seriplex, CAN and CAN-CAL, etc., facilitate communication among these devices. (U.S. Pat. No. 5,611,059 provides various examples of devices that control field devices.)

Another embodiment of the present invention is directed to a method of transmitting a CANOpen message in an automation system comprising a CANOpen network and a Modbus network. The method includes providing a CANOpen message embedded within a Modbus function code. The Modbus function code is transmitted from the Modbus network to a fieldbus coupler. The fieldbus coupler is operably connected to a CANOpen network having input and output field devices attached. The fieldbus coupler extracts from the Modbus message the CANOpen embedded therein, and transmits the embedded CANOpen message to the CANOpen field devices operably connected to the CANOpen network.

A table, commonly referred to as an object dictionary (OD), is located in the fieldbus coupler and at the CANOpen field device. This table or OD contains data particular to the CANOpen devices wherein the CANOpen message embedded in the Modbus function code command, configures or commands the targeted CANOpen field device. Any response message from the CANOpen node is embedded within a Modbus function code wherein the Modbus function code is transmitted to the Modbus network via the fieldbus coupler.

In an another embodiment of the present invention, the Modbus command contains a starting high and low address to select a subset of the CANOpen data returned to (read function) or sent from (write function) the FBC via the CANOpen field devices. Typically, CANOpen in response to a command delivers more information than is necessary to perform the automation control function. As a standard, CANOpen provides information in a fixed manner or fixed form. This fixed approach can result in inefficiencies, namely, a slow network response due to a crowded bandwidth. The starting address and offset of the needed control information from the field device reduces the bandwidth required, thus improving the response time.

Yet in another embodiment of the present invention, multiple Modbus function code messages can be grouped together. This grouping reduces overhead information, which is part of each single Modbus message. By grouping numerous Modbus messages together, bandwidth usage is reduced and network response time is improved. In addition, a series of CANOpen commands (each Modbus message contains a CANOpen command) can be grouped together to configure a CANOpen field device immediately. This allows a field device to be configured and operating without intervening traffic to other CANOpen devices. Therefore, once the CANOpen device has established communication with the CANOpen network, the device can be ready to perform its function soon thereafter.

Yet another embodiment of the present invention is directed to a medium readable by a computer. The medium provides a protocol for facilitating communication within an automation system executing an automation application. The automation system includes a Modbus network and a CANOpen network. The medium comprises a first function code having a read/write bit. The first function code is responsive to the read/write bit wherein the first function code reads or writes an object dictionary of a CANOpen device. The medium comprises a second function code wherein multiple function codes, e.g., the first function code, can be embedded within the second function code.

Other advantages and aspects of the present invention will become apparent upon reading the following description of the drawings and detailed description of the invention.

BRIEF DESCRIPTION OF THE DRAWINGS

FIG. 2A is an illustration of a message frame configured in accordance with one embodiment of the present invention;

FIG. 2B is an illustration of a Modbus message, function code "43," configured in accordance with an embodiment of the present invention;

FIG. 2C is a partial illustration of a Modbus message, function code "41," configured in accordance with an embodiment of the present invention;

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

A Controller Area Network (CAN) is a protocol for serial communications between devices generally used in automation environments. CANOpen is a protocol built on top of the CAN protocol. CANOpen specifies methods to describe messages exchanged between nodes on a CANOpen network. Modbus is another network protocol standard used in automation environments. The present invention is directed to providing a system, method and computer program for facilitating communication between nodes residing on these and other networks.

Figure 1:
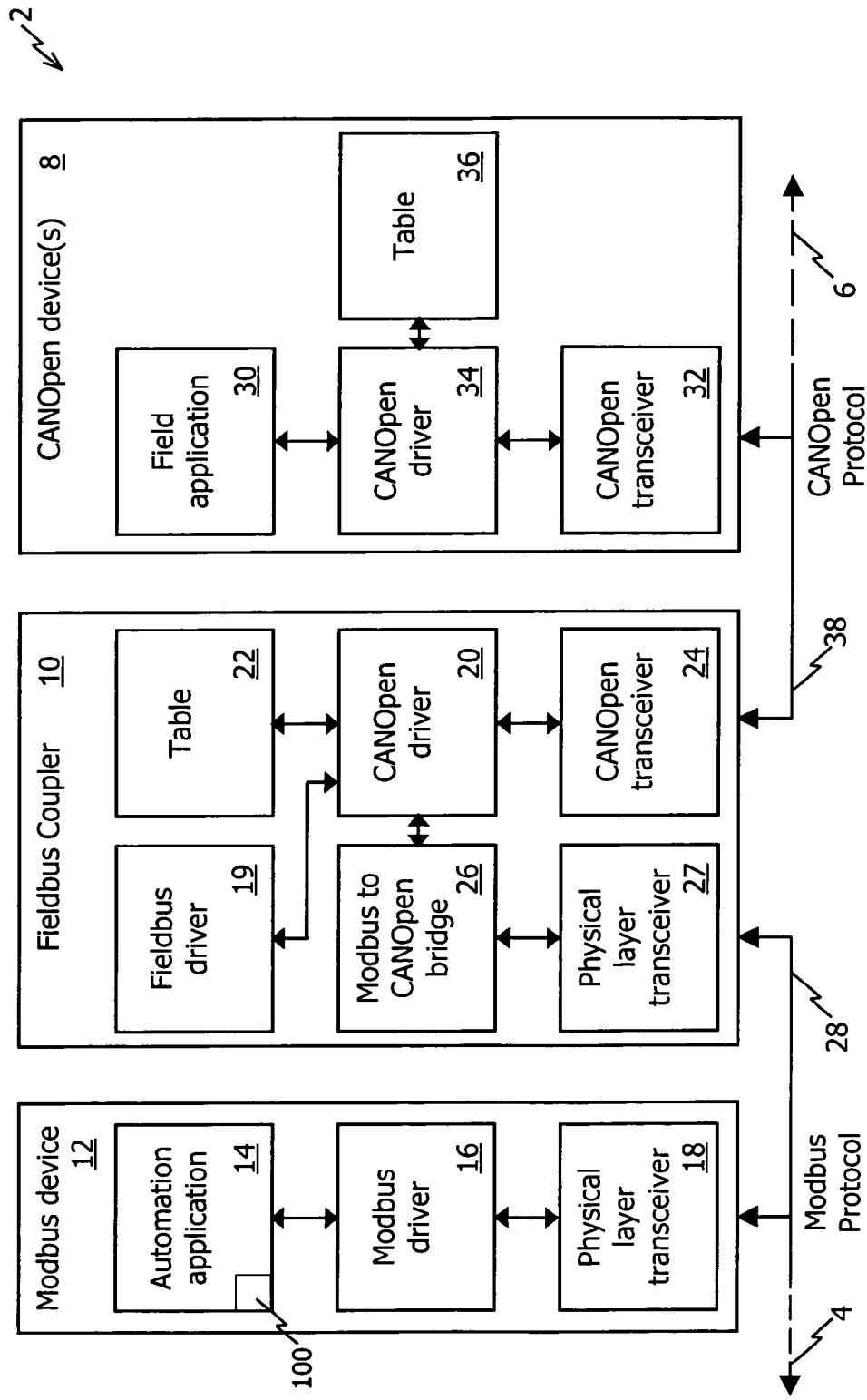
FIG. 1 is a block diagram of an exemplary automation system of one embodiment of the present invention.

Referring to FIG. 1, an automation system 2 is depicted comprising a Modbus network 4 and a CANOpen network 6. CANOpen devices 8, e.g., IO modules, are operably connected to the CANOpen network 6. The devices 8 and other devices on other networks such as DeviceNet, Profibus, and Ethernet are collectively called objects. A fieldbus coupler (FBC) 10 couples the CANOpen network 6 with the Modbus network 4. Other networks implementing other protocols can also be attached to the FBC 10.

The automation system 2 comprises an automation controller 12, the FBC 10 and one or more CANOpen nodes or devices 8, i.e., FBCs, IO modules, controllers, etc. The automation controller 12, e.g., Modbus device, includes an automation application 14, a Modbus communications driver 16 and a physical layer transceiver 18. The automation application 14 communicates with CANOpen devices 8 elsewhere in the system 2, and has access to a Modbus network 4. The Modbus communications driver 16 is accessible to the automation application 14. The physical layer transceiver 18 is connected to the Modbus driver 16.

The FBC 10 comprises an interface to the automation system 2. The protocol of the automation system 2 can be of any type. One embodiment of the present invention is directed to an automation system 2 implementing Modbus and CANOpen protocols. Also included in the FBC 10 is a fieldbus driver 19 operably connected to a CANOpen communications driver 20. The CANOpen communications driver 20 is connected to a table 22. The table 22 is a collection of indexed entries that define the objects in the automation system 2. Preferably, the table 22 is a CANOpen object dictionary (OD). The table 22, herein called an OD, is a collection of all the data items that have an influence on the behavior of the application objects, the communication objects and the state machine of the FBC 10. The OD 22 includes different data types, profile areas, etc., and essentially is a grouping of objects accessible via the network in an ordered, pre-defined fashion closely conforming with other industrial serial bus systems. A CANOpen transceiver 24 is used to send and receive CANOpen messages via the CAN physical layer. Software within the FBC 10, i.e., a Modbus-to-CANOpen bridge 26, accepts messages in Modbus format and converts them for use by the CANOpen driver 20. This FBC 10 program receives a Modbus function code 40, unpacks the embedded CANOpen message, sends the CANOpen message, and then re-packs the CANOpen device response into a Modbus message to the automation application 14. A physical layer transceiver 27 accessible to the Modbus-to-CANOpen bridge 26 is operably connected to a Modbus communication bus 28, which transmits the Modbus message to the automation application 14.

One or more CANOpen devices 8 can be operably connected to the automation system 2. The CANOpen device 8 comprises a field application program 30 that actively controls sensors or actuators connected to the device. A CANOpen transceiver 32 operably connected to a CANOpen communication bus 38 is used to send and receive messages via the CAN physical layer. A CANOpen communications driver 34 and its associated table 36, preferably an object dictionary (OD), are operably connected between the field application 30 and the CANOpen transceiver 32.

There are two primary means of communication between nodes on a CANOpen network 6: Process Data Objects (PDOs) and Service Data Objects (SDOs). PDOs are used to transmit data from the system that is under the control of the devices 8 on the CANOpen network 6, e.g., temperature or pressures values, parts count, etc. SDOs are used to exchange data between the nodes 8 themselves, e.g., the input range to be expected by a module, the preset value of a counter, scaling constants, etc. The data that is managed by the nodes 8 (as opposed to being produced by the controlled process) is stored at and retrieved from the nodes' OD 36.

An object of the present invention is to provide a protocol to be utilized with the automation application 14 running in the Modbus device 12 to query or make changes to the ODs of any other device in the system 2. Preferably, the present invention provides for the transmission of a CANOpen message over a Modbus network. It is to be understood that the present invention is not limited to networks and devices discussed in the preferred embodiment and that the present invention is also applicable with various other networks implemented on the non-Modbus side of the FBC 10 or other types of Modbus networks.

For a Modbus device 12 to be able to configure CANOpen devices 8, it must be able to read and write the ODs 22, 36 of the fieldbus coupler 10 and of the CANOpen devices 8. This specification describes a system and protocol for accomplishing this task. Furthermore, by collecting process data and storing it in the OD of one or more of the nodes, the process data can also be written or read via Modbus. The information needed to query or modify the ODs 36 in the CANOpen network 6 is mapped into the format of transmitted Modbus messages.

A new Modbus function code 40, i.e., function code "43," is used to read or write to the OD. FIG. 2B. This function code 40 will work with existing Modbus networks. Each function code is encapsulated in a Modbus frame 42, comprising a header (primarily the address of the Modbus node to receive the message, i.e., Modbus slave device such as the FBC 10), and a trailer (an LRC or CRC to verify message integrity). FIG. 2A. The Modbus frame 42 includes a device ID 44 of the receiving device and a function code 40, i.e. Modbus command. Data 46 contains information about the CANOpen message, the destination of the CANOpen message, and the CANOpen message within the OD 36 of the CANOpen device 8.

The new Modbus function code "43" allows the reading or writing of the network devices. The code 10 applies to both the Modbus Request and the Modbus Response messages. See Tables 1–3. A Modbus request message is a message to a Modbus slave device such as the FBC 10. A Modbus response message is the message returned from the Modbus slave device to the device sending the original Modbus request message or master device such as a programmable computer 100 within the automation application 14. The programmable computer 100 can be an industrial computer or a programmable logic controller that stores Modbus Request messages and executes these request messages as part of the automation application 14. This new code will support standard Modbus reference types. The Request message shown below only references the query for reference type 13 CANOpen OD reference. FIG. 4 lists a partial summary of supported Modbus commands.

TABLE 1

Request Message

| Byte number | Original request for standard register access |
|---|---|
| 0 | Device ID (44) |
| 1 | Function code = 2B hex |
| 2 | Reference Type for OD this will be 13 or (0D hex) |
| 3 | Read/Write Flag (bit 0 = 0 read bit 0 = 1 write) extend bit also included in this byte see note below. |
| 4 | Node ID. |
| 5 | Index High |
| 6 | Index low |
| 7 | Sub-Index |
| 8 | Starting Address High to Read/Write |
| 9 | Starting Address Low to Read/Write |
| 10 | Number of bytes High to Read/Write |
| 11 | Number of Bytes Low to Read/Write |
| 12 . . . n | Read/Write Data |
| N + 1, 2 | Error Check (LRC or CRC) |

NOTE: Byte 2, bit 7 (the EXTEND bit) can indicate, if set, that this is a portion of a multiple message transaction. The data provided should be buffered by the receiver and not placed into the OD until a message arrives for this node/index/sub-index with the EXTEND bit clear.

TABLE 2

Normal Response Message

| Byte number | Original request for standard register access |
|---|---|
| 0 | Device ID (44) |
| 1 | Function code = 2B hex |
| 2 | Reference Type for OD this will be 13 or (0D hex) |
| 3 | Read/Write Flag (bit 0 = 0 read bit 0 = 1 write) extend bit also included in this byte see note below. |
| 4 | Node I.D. |
| 5 | Index High |
| 6 | Index low |
| 7 | Sub-Index |
| 8 | Starting Address High Read/Write |
| 9 | Starting Address Low Read/Write |
| 10 | Number of bytes High Read/Write |
| 11 | Number of Bytes Low Read/Write |
| 12 . . . N | Read/Write Data |
| N + 1, 2 | Error Check (LRC or CRC) |

TABLE 3

Exception Response

| Byte number | Value |
|---|---|
| 0 | Function Code 2B Hex + 80 Hex (indicates error) |
| 1 | Exception code |
| 2 | Sub Exception code |
| 3, 4 | Error Check (LRC or CRC) |

The function code "43" allows a direct read and write by a Modbus device 12 into any CANOpen node's OD 36, at any offset, within any index and sub-index, without regard to the previous history of commands between the devices. The index is a location of an object within the OD 36 of a CANOpen device. The sub-index is a sub-location within the index. Specifically, function code "43" provides for a read/write to a CANOpen index/sub-index of a node 8. Each location in a CANOpen node 8 has a predefined byte size. The starting address offset and number of bytes defines the portion containing data being sought. Efficiency in the communication bus traffic is increased because less bandwidth is utilized since an entire block of data does not need to be read/written.

Referring to FIG. 2B, the function code 40 comprises an address field for storing a network slave device identifier 72. The slave ID 72 identifies the slave device to which the Modbus frame is to be sent when the message is being sent from a master device. When the frame originates at a slave device and is to be sent to a master device, the slave ID 72 identifies the slave device from which the Modbus frame was sent. Thus, the master addresses the slave by placing the slave address identifier 72 in the address field of the message, and when the slave sends its response, the slave places its own address in the address field to inform the master which slave is responding. The reference type 50 indicates that the data to follow will be a CANOpen read or write. The reference type 50 can change to accommodate the various CANOpen message types, or expand to accommodate other industrial networks. The read/write extend byte 52 indicates specifically whether it is a read or write CANOpen message contained within this data field. The extend byte 52 furthers serves the purpose of indicating whether this Modbus inquiry or response will require a Modbus message over 256 bytes. The Node ID 54 indicates the destination node (CANOpen device 8), i.e., OD entry, on the CANOpen network 6 to be read or written with the data contained in the Modbus message. The Index High 56 and Low 58 and Sub-Index 60 indicate the OD or target destination from which the reading and writing will occur.

The Starting Address High byte 62 and Starting Address Low byte 64, together are the 16 bit offset, to begin the read or write within the OD 22, 36. The Number High 66 and Low 68 Bytes indicate the number of bytes to read or write from the OD of any Modbus slave device on the network (e.g. a CANOpen device 8). The Starting High 62 and Low 64 addresses and the Number High 66 and Low 68 bytes, together, define the portion of the OD to access. The Read/Write Data is the data to be read or written into the OD index 56, 58 and Sub-Index 60.

Furthermore, there is a method (the EXTEND bit) for the Modbus device 12 to indicate whether a transmission will be followed by another, and that the current data transmitted should be buffered (outside the OD) until all segments have been transferred. If the data for the OD entry cannot fit in a single Modbus message 42, the transaction must be indicated as an EXTENDed transaction by setting the high bit of the byte containing the requested byte count to write.

There are two typical cases. The first case is where the data is small enough to fit into one Modbus message 42. In this case, the offset is zero and the EXTEND flag is also zero. The entire data is transferred to the FBC 10 in one message, and replaces the data in the existing OD entry. The other case is where the data is too large to fit into a single Modbus message 42. In this case, the first message is also started with an offset equal to 0; the data is provided and the EXTEND flag is set to 1. The new data is not written into the OD. The second message (and possibly additional message) contains additional data for the OD entry. The message that contains the last byte to be written to the OD entry will have its EXTEND bit clear (equal to 0). In general, the EXTEND bit equal to 0 indicates that writing is complete and all data received should be put to use in the OD. Until a message is received with EXTEND equal to 0, the data must be buffered and not placed actively into the OD entry.

Transaction types are not required to be identical. However, any CANOpen transaction type will abort any previous CANOpen EXTENDed write transaction in progress. This is not considered an error.

Figure 2D:
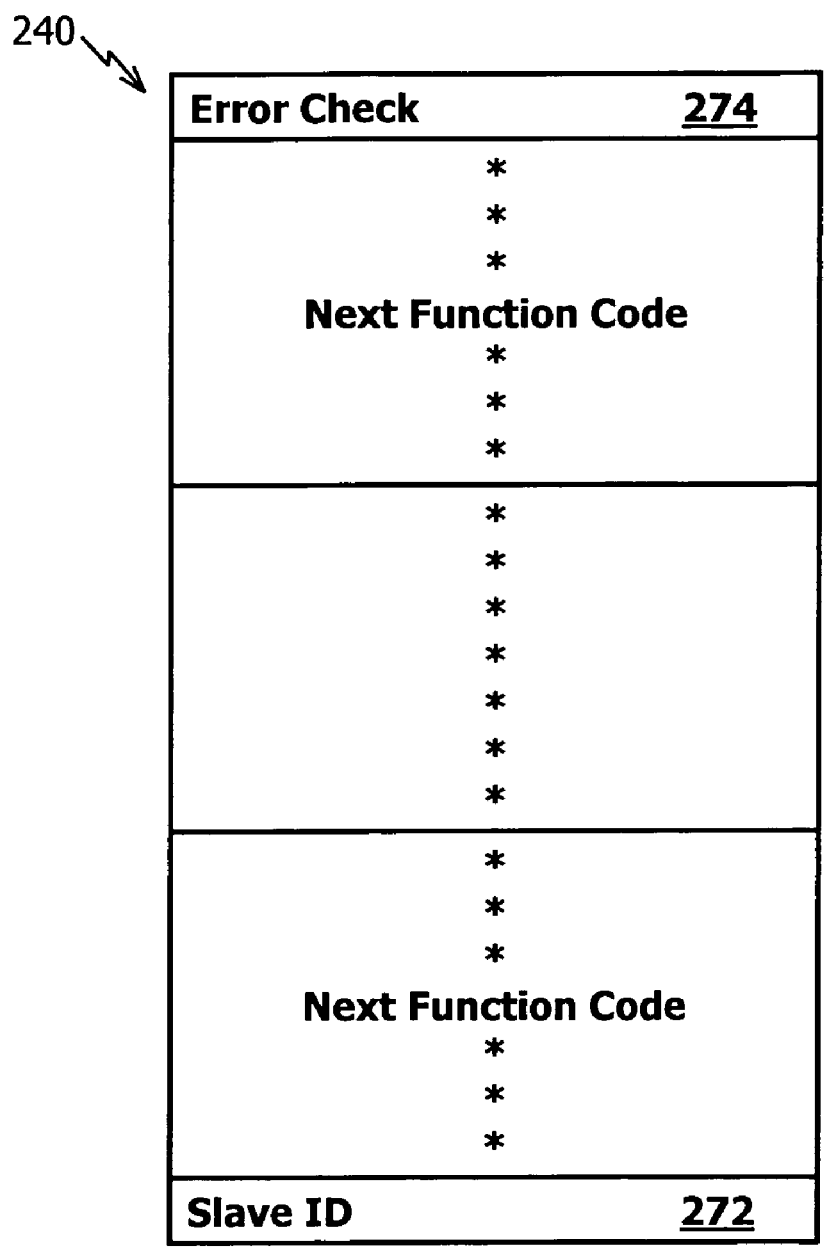
FIG. 2D is an illustration of a Modbus message, function code "41," configured in accordance with an embodiment of the present invention.

Another new Modbus command 140, function code "41," is capable of performing multiple function codes 40. FIG. 2C. (The last two digits of the elements in FIGS. 2C and 2D correspond to the similar elements identified by the same last two digits in FIG. 2B.) This command is setup to handle any multiple Modbus function codes 40 in one transmission and applies to both the Request and the Response messages. See Tables 4–6. Function code "41" allows a user to embed multiple Modbus function codes 40 into itself. The embedded function codes reduce overhead because an individual header and footer in not required for each embedded function code contained in a single function code "41" command. One error check is required for the function code "41," rather than multiple error checks (decreasing overhead or bandwidth) for each single Modbus function code. See FIG. 2D.

TABLE 4

Request Message

| Byte number | Original request for standard register access |
|---|---|
| 0 | Function code = 29 hex |
| 1 | Reserved Byte must be equal to 00 |
| 2 | First Function Code |
| 3 . . . N | Next Bytes are identical to the Function Code requested. |
| N + 1 | Next Function Code |
| N + 1 . . . M | Next Bytes are identical to the Function Code requested. |
| M + 1, 2 | Error Check (LRC or CRC) |

TABLE 5

Normal Response Message

| Byte number | Original request for standard register access |
|---|---|
| 0 | Function code = 29 hex |
| 1 | First Function Code |
| 2 . . . N | Next Bytes are identical to the Normal Function Code requested. |
| N + 1 | Next Function Code |
| N + 2 . . . M | Next Bytes are identical to the Normal Function Code requested. |
| M + 1, 2 | Error Check (LRC or CRC) |

TABLE 6

Exception Response Message

| Byte number | Value |
|---|---|
| 0 | Function Code 29 Hex + 80 Hex (indicates error) |
| 1 | First Function Code (See note below) |
| 2 ... N | Next Bytes are identical to the Normal Function Code requested. |
| N + 1 | Next Function Code if in error will have 80 added to Function Code |
| N + 2 ... M | Function Code specific exception responses. |
| M + 1, 2 | Error Check (LRC or CRC) |

NOTE: The Exception Response message will be used when an error of a function code inside of the multiple function code packet has an error. The multiple function code will be executed until an error has been encountered. This will stop the processing and invoke the exception response. All function codes before the error will be evaluated and the Exception Response will contain a normal Response for these function codes. This will be followed by the Exception Response for the function code in error. All function codes that follow the error will not be performed.

If the returned data does not contain the last byte of the data in the OD, the EXTEND bit will be set in the Modbus response. Getting back less data than requested is not an error if the EXTEND bit is clear; it merely indicates that the last section of data from the OD has been read Now, referring again to FIG. 1, an example of a communication process of one embodiment of the present invention is discussed. A READ function is initiated from a Modbus tool, i.e., programmable computer 100, for reading data from a FBC 10. The READ is a request message or SDO CANOpen message type. The FBC 10 receives the READ from the programmable computer 100 in Modbus format and sends the CANOpen SDO request out over the CANOpen communication bus 38 to the specified device identified by its Node ID 54 and its associated addressing Indices 56, 58 and its Sub-Index 60. The CANOpen device 8 attains all the data found at its Indices and Sub-Index. The FBC 10 receives the data and then sends a RESPONSE to the requesting device 100, the RESPONSE is the answer to the READ. The information returned with the RESPONSE is at a Starting High 62 and Low 64 address and the Number High 66 and Low 68 bytes. The protocol is written so that requests can be made randomly into any part of any node's OD. Thus, the present invention reduces bus traffic and improves response time from and to the devices within the automation system.

A WRITE function is a similar process between the programmable computer 100 to the FBC 10. The function code "43" is sent to the FBC 10, but having the read/write bit 52 set to Write. The Indices 56, 58 and Sub-Index 60 identify the OD 36 location within the CANOpen device 8 identified by the Node ID 54. The FBC utilizes the Starting High 62 and Low 64 addresses and Number High 66 and Low bytes 68 along with the Read/Write Data 70 to formulate and transmit a CANOpen message out to the network.

Figure 3:
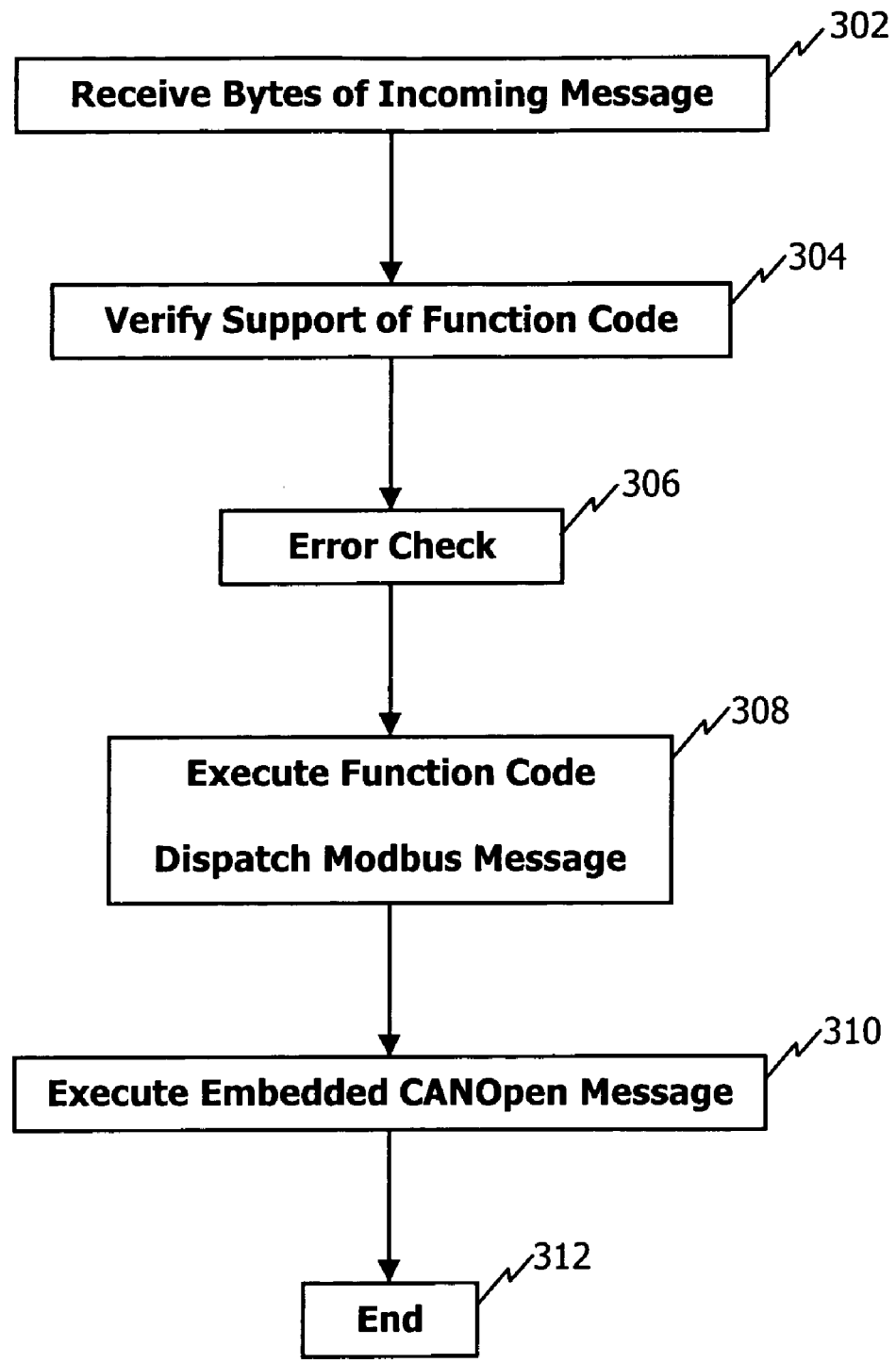
FIG. 3 is a flowchart of one embodiment of the present invention depicting the management of a Modbus message; and, FIG. 4 is a table showing a partial summary of Modbus commands supported by one embodiment of the present invention.

FIG. 3 outlines the management of a network message of one embodiment of the present invention and it is to be understood that the present invention is not limited to this description. In step 302, the FBC 10 receives the bytes of an incoming network message, preferably a Modbus function code 40. As each byte is received, the FBC 10 stores the information in temporary memory. Once the message has been received, the FBC 10 program in step 304 utilizes the error check 74 to determine if a correct number of bits have been received at the slave device 8 or FBC 10. In addition, the FBC 10 program verifies that the Modbus function code 42 is supported.

After verification of the Modbus function code 42 by the FBC 10 program, the same FBC 10 program verifies the correctness of the received Modbus function code 40. Step 306. The FBC 10 program determines if the addressing received is correct and guarantees the lengths requested do not exceed addressing limits. If there is an error, the FBC 10 program sends an error response to the automation application 14 indicating that the Modbus function code 40 has been received with an error. The automation application 14 will determine whether to re-transmit or ignore. There is no "time out" feature, e.g., the FBC 10; the CANOpen device 8 via the FBC 10; or notification by the automation application 14 to a slave device 8 or FBC 10 of a required response time; at a slave device. Standard Modbus protocol implements an immediate response from a slave device. The automation application 14 will assume the message has been received, validated and processed.

In step 308, the FBC 10 program executes the Modbus function code 40 received. As discussed above, Modbus function codes "41" and "43" can have more than one CANOpen message or just one CANOpen message embedded in the Modbus function code, respectively. For Modbus function code "43," the FBC 10 program sends the embedded CANOpen message via the Modbus to the CANOpen bridge 26 along with the various Modbus control fields 52–68 to the CANOpen driver 20 for execution. In step 310, the FBC 10 program executes the embedded CANOpen message via the CANOpen driver 20 through the CAN transceiver 24 onto the CANOpen network 38. Once the FBC 10 program in Step 310 executes the CANOpen message, the CANOpen network protocol has control until the information is returned to the FBC 10 or the CANOpen device 8 notifies the FBC 10 that the message is complete.

While the specific embodiments have been illustrated and described, numerous modifications come to mind without significantly departing from the spirit of the invention and the scope of protection is only limited by the scope of the accompanying claims.

We claim:

1. A system comprising:
    a Modbus device having an embedded automation application, the Modbus device being operably connected to a communication bus;
    a fieldbus coupler operably connected to the automation application via the communication bus, the fieldbus coupler including a network driver and an object dictionary of a network protocol, the object dictionary operably coupled to the network driver;
    a network being operably connected to the fieldbus coupler, the network including a network node having a table for holding data and parameters transmitted or received throughout the system; and,
    a protocol utilized by the automation application to access the network node, the protocol configured to one of query the table holding data and parameters in the node and make a change to the table holding data and parameters at a specified offset address in the table.

2. The system of claim 1 wherein the protocol comprises:
    a Modbus message frame comprising:
    a header having an address identifier;
    a trailer having an error verifier; and, a Modbus function code encapsulated between the header and the trailer, wherein the automation application transmits a network message embedded within the Modbus function code to the network node table.

3. The Modbus communication protocol of claim 2 wherein the Modbus function code comprises a Modbus sub-function code.

4. The Modbus communication protocol of claim 2 wherein the Modbus function code comprises:
a read/write function code having a read/write bit, the read/write function code further being operably responsive to the read/write bit wherein the read/write function code reads or writes the network node table.

5. The Modbus communication protocol of claim 4 wherein the read/write function code comprises:
an index and a sub-index defining a location within the network node table; and,
a starting address, the starting address is the offset into the network node being referenced by the index and the sub-index.

6. The Modbus communication protocol of claim 5 wherein the read/write function code comprises:
a byte amount defining an amount of bytes, the starting address and the byte amount defining a portion within the network node table to be read or written by the read/write function code wherein the automation application can directly access the portion of the network node table.

7. The Modbus communication protocol of claim 2 wherein the Modbus function code comprises a plurality of Modbus function codes encapsulated within the Modbus message frame.

8. The system of claim 1 wherein the network is CANOpen.

9. The system of claim 1 wherein the table is a CANOpen object dictionary.

10. An automation control system comprising:
a fieldbus coupler operably connected to a Modbus communication bus;
a Modbus device having an automation application, the Modbus device being operably connected to the fieldbus coupler via the Modbus communication bus;
a Modbus protocol for communicating between the Modbus device and the fieldbus coupler;
a network communication bus being operably connected to the field bus coupler;
a network device being operably connected to the fieldbus coupler via the network communication bus;
a network protocol for communication between the network device and the fieldbus coupler;
the Modbus device and the network device being in communication with each other wherein the fieldbus coupler facilitates communication between the Modbus device and the network device by converting to and from the Modbus protocol and the network protocol, the Modbus protocol utilized by the automation application to one of query a network table in the network device and make a change to the network table at a specified offset address in the object dictionary.

11. The system of claim 10 wherein the fieldbus coupler comprises:
a fieldbus physical layer transceiver being operably connected to the Modbus communication bus;
a Modbus to network bridge being operably connected to a network driver and the physical layer transceiver;
a fieldbus driver being operably connected to the network driver;
a fieldbus network table being operably connected to the network driver; and,
a fieldbus network transceiver being operably connected to the network driver and the network communication bus.

12. The system of claim 10 wherein the Modbus device comprises:
a Modbus physical layer transceiver being operably connected to the Modbus communication bus;
a Modbus driver being operably connected to the Modbus physical layer transceiver; and,
an automation application being operably connected to the Modbus driver.

13. The system of claim 10 wherein the network device comprises:
a network transceiver being operably connected to the network communication bus;
a network driver being operably connected to the network transceiver;
wherein the network table being operably connected to the network driver; and,
a field application being operably connected to the network driver.

14. The system of claim 13 wherein the table is a CANOpen object dictionary.

15. The system of claim 10 wherein the network is CANOpen.

16. A Modbus communication protocol for an automation system executing an automation application, the automation system comprising a fieldbus coupler being operably connected between a Modbus network having a Modbus device and a network having a network device including a network table, the Modbus communication protocol comprising:
a Modbus message frame comprising:
a header having an address identifier;
a trailer having an error verifier; and,
a Modbus function code encapsulated between the header and the trailer, wherein the automation application transmits a network message embedded within the Modbus function code to the network device table and utilizes the Modbus communication protocol to one of query the table and make a change to the table at a specified offset address in the table.

17. The Modbus communication protocol of claim 16 wherein the Modbus function code comprises a Modbus sub-function code.

18. The Modbus communication protocol of claim 16 wherein the Modbus function code comprises:
a read/write function code having a read/write bit, the read/write function code further being operably responsive to the read/write bit wherein the read/write function code reads or writes the network device table.

19. The Modbus communication protocol of claim 18 wherein the read/write function code comprises:
an index and a sub-index defining a location within the network table; and,
a starting address, said starting address is an offset into the table being referenced by said index and said sub-index.

20. The Modbus communication protocol of claim 19 wherein the read/write function code comprises:
a byte amount defining an amount of bytes, the starting address and the byte amount defining a portion within the network table to be read or written by the read/write function code wherein the automation application can directly access the portion of the network table.

21. The Modbus communication protocol of claim 16 wherein the Modbus function code comprises a plurality of Modbus function codes encapsulated within the Modbus message frame.

22. The Modbus communication protocol of claim 16 wherein the network is CANOpen.

23. The Modbus communication protocol of claim 16 wherein the table is a CANOpen object dictionary.

24. A medium readable by a computer, the medium providing a protocol for communicating within an automation system executing an automation application, the automation system including a Modbus network and a network, the medium comprising:
  a first function code having a read/write bit, the first function code being responsive to the read/write bit wherein the read/write function code reads or writes a table of a network device, the first function code comprising an index and a sub-index defining a location within the table of the network device; and, a starting address, said starting address is an offset into the table being referenced by said index and said sub-index.

25. The medium of claim 24 further comprising:
  a second function code comprising a plurality of Modbus function codes encapsulated within the second function code.

26. The medium of claim 24 wherein the first function code comprises:
  a byte amount defining an amount of bytes, the starting address and the byte amount defining a portion within the table to be read or written by the first function code wherein the automation application can directly access the portion of the table of the network device.

27. The medium claim of 24 wherein the network is CANOpen.

28. The medium claim of 24 wherein the table of the network device is a CANOpen object dictionary.

29. A system comprising:
  a device utilizing a first protocol having an embedded automation application, the device being operably connected to a communication bus;
  a fieldbus coupler operably connected to the automation application via the communication bus;
  a network being operably connected to the fieldbus coupler, the network including a first network node utilizing a second protocol having a table for holding data and parameters transmitted or received throughout the system; and,
  a bridge in the fieldbus coupler that accepts messages from the device and converts the messages for use by the node wherein the first protocol is configured to one of query the table and make a change to the table at a specified offset address in the table.

30. The system of claim 29 wherein the first protocol is a Modbus protocol.

31. The system of claim 30 wherein the second protocol is a CANOpen protocol.

32. The system of claim 29 further comprising a plurality of additional network nodes utilizing the second protocol in the network.

* * * * *